United States Patent [19]

Bil

[11] 3,959,377

[45] May 25, 1976

[54] METHOD FOR PREPARING 2-NITRO-4-AMINO-N-PHENYLANILINE

[75] Inventor: Milos S. Bil, Forest Hills, N.Y.

[73] Assignee: Clairol Incorporated, New York, N.Y.

[22] Filed: Oct. 30, 1972

[21] Appl. No.: 302,073

Related U.S. Application Data

[60] Continuation-in-part of Ser. No. 230,042, Feb. 28, 1972, which is a continuation-in-part of Ser. Nos. 92,868, Nov. 25, 1970, Pat. No. 3,758,499, and Ser. No. 93,465, Nov. 7, 1970, which is a division of Ser. No. 683,758, Nov. 2, 1967, abandoned, and Ser. No. 719,682, April 8, 1968, Pat. No. 3,632,582, and Ser. No. 725,936, May 1, 1968, Pat. No. 3,586,719.

[52] U.S. Cl. .............................................. 260/576
[51] Int. Cl.² .......................................... C07C 87/60

[58] Field of Search ............................ 260/576, 581

[56] References Cited
OTHER PUBLICATIONS
Ainsworth et al., "J. Chem. Soc.," 1966:111–113 (1966).

*Primary Examiner*—Lewis Gotts
*Assistant Examiner*—S. P. Williams
*Attorney, Agent, or Firm*—Irving Holtzman; George A. Mentis; David J. Mugford

[57] ABSTRACT

Prepares 2-nitro-4-amino-N-phenylaniline by reacting 4-fluoro-3-nitroaniline at a temperature of at least about 140°C and in a large molar excess of aniline e.g. molar ratio of aniline to 4-fluoro-3-nitroaniline being at least about 5:1.

10 Claims, No Drawings

METHOD FOR PREPARING 2-NITRO-4-AMINO-N-PHENYLANILINE

This application is a continuation-in-part of application Ser. No. 230,042 filed Feb. 28, 1972 which in turn is a continuation-in-part of application Ser. No. 92,868 filed Nov. 25, 1970 now U.S. Pat. No. 3,758,499 and Ser. No. 93,465 filed Nov. 7, 1970 which in turn are divisions of Ser. No. 683,758 filed Nov. 2, 1967 (now abandoned), Ser. No. 719,682 filed Apr. 8, 1968 now U.S. Pat. No. 3,632,582 and Ser. No. 725,936 filed May 1, 1968 now U.S. Pat. No. 3,586,719.

This invention relates to a process for preparing 4-amino-2-nitro-diphenylamine i.e.

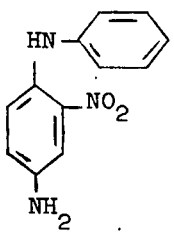

also sometimes called and hereinafter designated as 2-nitro-4-amino-N-phenylaniline. This compound is useful as a red hair dye for human hair and is employed as a component in the blending of natural-looking shades of hair dye compositions intended particularly for use on living hair.

Methods for preparing 2-nitro-4-amino-N-phenylaniline were described in the U.S. Pat. No. 3,088,978 to Brunner and Halasz (See Examples 4 and 5). These processes each involve the catalytic hydrogenation of N-phenyl-2,4-dinitroaniline to 2-nitro-4-amino-N-phenylaniline. However, the yield of desired product obtained by these methods are quite low being about 20% based on isolated pure product.

In U.S. application Ser. No. 230,042 filed Feb. 28, 1972 there is described a process for preparing 2-nitro-4-amino-N-phenylaniline which comprises reacting 4-fluoro-3-nitroaniline (0.60 mole) with aniline (2.42 moles) at 120°C. In accordance with this process, dark crystalline material obtained from this reaction is boiled with dilute hydrochloric acid and hot filtered and on cooling yellow brown crystals of the pure hydrochloride are separated. However, the yield of desired product, although an improvement over that described in U.S. Pat. No. 3,088,978, still left something to be desired, it being approximately 42%. Furthermore, the separation procedures are slow and time consuming and therefore uneconomical.

It has now been found that the yield of desired product (i.e. 2-nitro-4-amino-N-phenylaniline) can be materially increased in the process of reacting aniline with 4-fluoro-3-nitroaniline if the reaction is carried out at a temperature of at least about 140°C and the molar ratio of aniline to 4-fluoro-3-nitroaniline employed is at least about 5:1. It has further been found that the yield is still further increased if the desired product is crystallized in the presence of sulfuric acid. It has also been found that the corrosion of the reaction kettles employed in such a process is materially reduced if a hydrogen fluoride binding agent (e.g. an inorganic salt which will react with HF to form an insoluble fluoride) is present in the reaction mixture.

It is, accordingly, an object of the present invention to provide an improved process for preparing 2-nitro-4-amino-N-phenylaniline by the reaction of aniline with 4-fluoro-3-nitroaniline.

Other and more detailed objects of this invention will be apparent from the following description and claims.

In reacting 4-fluoro-3-nitroaniline with aniline three competing reactions take place:

a. a nucleophilic displacement of the activated fluorine atom by aniline;

b. oxidation of aniline by the unreacted fluoronitroaniline (this product is soluble in dimethylformamide, acetone or isopropanol giving a blue color and is removable by hot filtration of the acidified reaction mixture);

c. formation of a dark resin which is insoluble in hydrochloric acid and isopropanol and which is removable from the reaction mixture using the same procedure described under (b) above.

The increase in yield found in the process of the present invention is attributable to the fact that at the higher temperature i.e. at least 140°C and high molar excess of aniline as compared with 4-fluoro-3-nitroaniline i.e. at least 5:1 reaction (a) is favored and proceeds at a relatively fast rate becoming the predominant reaction. This is done to a large extent at the expense of reaction (b) which is much slower under these conditions and therefore, only constitutes a minor proportion of the total reaction and to some extent, at the expense of reaction (c).

In carrying out the process of the present invention, as previously mentioned, it is necessary to maintain the reaction mixture temperature at least about 140°C. Ordinarily, the reaction may be carried out between 140° to 150°C. However, it is the preferred procedure to use a temperature of about 140°C to obtain highest yields and minimize the sublimation and decomposition of the starting fluoronitroaniline.

Similarly, as indicated above, it is an essential feature of this invention that the aniline be employed in a large molar excess i.e. the molar ratio of aniline to 4-fluoro-3-nitroaniline employed in the reaction is to be at least 5:1. The excess aniline, besides markedly influencing the yield of desired product, also serves as reaction medium and is partly recovered by steam distillation. Ordinarily, it is advantageous to employ an aniline: 4-fluoro-3-nitroaniline molar ratio in the range of from about 5:1 to 6:1, the optimum results being obtainable with a molar ratio of 5:1.

The importance of the molar ratio of aniline to 4-fluoro-3-nitroaniline is illustrated in the table below. Using the same procedure given in Example 2 for preparing the desired compound in the form of salts and the procedure of Example 3 for recovering the desired compound in the form of the free base, the reaction was run a number of times using four different aniline to 4-fluoro-3-nitroaniline molar ratios. The procedure and the workup were identical in each instance; the only variable being the molar ratio of aniline to 4-fluoro-3-nitroaniline. The results of these experiments are given in the table below. The range 58–63% given for the 5:1 aniline to 4-fluoro-3-nitroaniline molar ratio is a result of five runs using the same molar ratio.

| Molar Ratio Aniline/<br>4-fluoro-3-nitroaniline | % Yield of 2-nitro-4-<br>amino-N-phenylaniline<br>(isolated as free base) |
| --- | --- |
| 3.5 : 1 | 41 |
| 4.2 : 1 | 45 |
| 5 : 1 | 58–63 |
| 8 : 1 | 56 |

It is a further feature of the present invention to crystallize the desired product in the presence of a small quantity of sulfuric acid. In carrying out this process, after the aniline and 4-fluoro-3-nitroaniline are reacted and the excess aniline is removed, the reaction mixture is diluted with aqueous hydrochloric acid and heated to convert the 2-nitro-4-amino-N-phenylaniline to the corresponding hydrochloride in an aqueous hydrochloric acid medium. Solid hydrochloride separates from this solution on cooling. However, it has been found that the yield of desired product can be further increased if the hydrochloride is crystallized from aqueous acid medium to which has been added a small quantity of sulfuric acid. The quantity of sulfuric acid that may be used for this purpose may vary somewhat. However, it will ordinarily be employed in an amount of 20–30g. of $H_2SO_4$ (98%) to 100g. of hydrochloric acid (36%) and preferably in the ratio of 25 g. to 100 g.

Aside from increasing the yield of desired product, the crystallization of said hydrochloride from an aqueous medium containing sulfuric acid, which incidentally results in a mixture of the hydrochloride and sulfate of 2-nitro-4-amino-N-phenylaniline, has other advantages. During the drying of the simple wet hydrochloride at elevated temperatures, in the air or vacuum, a slight surface charring takes place. This is eliminated when the hydrochloride is crystallized from an aqueous medium containing sulfuric acid. Moreover, it has been found that the product crystallized from said aqueous sulfuric acid medium may be much more rapidly filtered and washed so that the overall economics of the process is improved.

If desired, the hydrochloride or the mixture of hydrochloride and sulfate of 2-nitro-4-amino-N-phenylaniline obtained by the present process may be converted into the corresponding free base by any of a variety of processes that are well known to those skilled in the art. One typical procedure involves making a slurry of the hydrochloride or mixture of sulfate and hydrochloride in water and adding sufficient base (e.g. ammonia or an alkali carbonate or bicarbonate) to make the slurry alkaline and then recovering the precipitated free base.

It is also a feature of the present invention to incorporate in the reaction mixture a hydrogen fluoride binding agent to prevent the corrosion of the reaction kettle in which the process is being carried out. Hydrogen fluoride is liberated during the whole reaction period as a gaseous by-product. Initially it combines with aniline to form the aniline hydrofluoride, but due to the prevailing high temperature it is immediately decomposed back to aniline and hydrogen fluoride, which escapes from the liquid layer. For this reason, excess of aniline cannot serve as an efficient hydrogen fluoride binder. Inorganic salts, capable of reacting with hydrogen fluoride to yield a fluoride insoluble in dilute mineral acid, have been found most suitable for this purpose. By way of illustrating inorganic salts that are useful for this purpose, mention may be made of calcium carbonate, magnesium carbonate, etc.

The quantity of hydrogen fluoride binding agent that will be incorporated in the reaction mixture will vary somewhat. All that is necessary is that sufficient amount be added to take up the theoretical amount of liberated hydrogen fluoride. As a practical matter, it is useful to use a slight excess of said binder over the theoretical requirements. In general, however, the molar ratio of inorganic salt (e.g. $CaCO_3$) to 4-fluoro-3-nitroaniline employed will be in the range of from 0.5:1 to 0.8:1 and preferably 0.55:1. Reaction of 4-fluoro-3-nitroaniline with aniline was also studied using dimethylformamide as the reaction medium. There was, however, no meaningful increase in the speed of reaction or yield, which sometimes occurs with this aprotic solvent.

The following Examples are given by way of further illustration of the present invention. It is to be understood, however, that the invention is not limited thereto.

EXAMPLE 1

93.6 g. (0.6 mole) of 4-fluoro-3-nitroaniline and 279 g. (3.0 mole) of aniline were heated at 140°C for 21.5 hours. The unreacted aniline was then thoroughly removed by steam distillation. The volume of distillate was 4,900 ml. and aniline layer in it amounted to ca. 120 ml. The mixture remaining in the still (ca. 120 ml.) was diluted with water to a volume of 3,000 ml. 160 ml. of concentrated hydrochloric acid was then added and the whole mixture heated to 90°C. After holding this mixture at this temperature for 15 minutes, it was filtered hot.

A near black residue was obtained on the filter (28.9 g. after drying) which contained some of the product and in addition, a blue and a dark compound which was insoluble in alcohol.

The filtrate was allowed to cool to 8°C with stirring, a yellow slurry was filtered off, washed ten times with 50 ml. portions of cold water until the starting fluoronitroaniline was removed and the washings were only slightly acidic. Then the yellow cake was dried first at 45°C in the air and then in a desiccator over $H_2SO_4$ to constant weight.

The yield was 90.6 g. of the hydrochloride of 2-nitro-4-amino-N-phenylaniline corresponding to $C_{12}H_{11}N_3O_2$ HCl (N theor. = 15.8%, found = 16.4) which is 56.9% of theory. The product is chromatographically pure.

EXAMPLE 2

187.2 g. (1.2 mole) of 4-fluoro-3-nitroaniline and 558 g. (6 moles) of aniline were heated at 140°C for 24 to 26 hours. The unreacted aniline was then thoroughly removed by distillation and the mixture remaining in the still was diluted with water to a volume of 6.6 liters. 320 ml. of concentrated hydrochloric acid was then added and the whole mixture heated to 90°C. The mixture was held at this temperature for one-half hour, filtered hot and then the filtrate was allowed to cool to about 50°C. 50 ml. of concentrated sulfuric acid was then added and the cooling of the reaction mixture was continued until it reached 5°C. A bright yellow slurry was obtained which was filtered off and the resulting filter cake was washed thoroughly, as in Example 1, until all the unreacted fluoronitroaniline was removed and the washings were only slightly acidic. The product was then predried in the air at 45°C and the drying finished in vacuum at 60° to 80° C. The yields in these experiments varied from 191 to 216 g. of yellow small crystals, melting at ca. 230°, and representing the chloride with some sulfate of the desired 2-nitro-4-amino-N-phenylaniline. Product is chromatographically pure. Based on free base, the yield represents 58 to 63% of theory.

EXAMPLE 3

The carefully washed cake of the mixture of hydrochloride and sulfate obtained by the procedure of Example 2 was finely slurried in 1700 ml. of water at room temperature. Concentrated ammonia was then added (55 ml.) until the slurry was permanently alkaline. A red brown slurry was obtained which was filtered off and washed to neutrality with water and then dried in vacuum at from 70° to 80°C. There was obtained in five experiments a yield of 159 to 174 g. (= 58 to 63% of theory) a red brown microcrystalline powder of the free base which has a melting point of 102°–103°C (corr.).

EXAMPLE 4

187.2 g. (1.2 moles) of 4-fluoro-3-nitroaniline, 558 g. (6 moles) of aniline and 66 g. (0.66 moles) of calcium carbonate, fine powder were heated at 140°C for 26 hours. Working up followed exactly the procedure of Example 3.

Final product i.e. free base of m.p. 101°–103° (corr.) contains some calcium sulfate. Pure product can be obtained by extraction with a suitable solvent e.g. alcohol, acetone, ethylacetate, etc.

During the whole reaction period only a minimal acidity in vapor phase was observed (pH ca. 6.5–6.8), whereas without the CaCO₃ addition pH was ca. 4.5–5.

Although the invention has been described with reference to specific forms thereof, it will be understood that many changes and modifications may be made without departing from the spirit of this invention.

What is claimed is:

1. In a process for preparing 2-nitro-4-amino-N-phenylaniline the improvement which comprises reacting 4-fluoro-3-nitroaniline with aniline at a temperature of about 140° to 150°C and recovering the 2-nitro-4-amino-N-phenylaniline, said reaction being carried out in the presence of large molar excess of aniline; the molar ratio of aniline to 4-fluoro-3-nitroaniline being 5:1 to 8:1.

2. A process according to claim 1 wherein the reaction is carried out in the presence of an inorganic salt capable of reacting with hydrogen fluoride generated during said reaction to produce a fluoride which is insoluble in dilute mineral acid.

3. A process according to claim 2 wherein the recovery procedure comprises removing unreacted aniline from the reaction mixture, extracting the reaction mixture with aqueous hydrochloric acid to dissolve and form an extract containing 2-nitro-4-amino-N-phenylaniline hydrochloride and recovering from said extract the 2-nitro-4-amino-N-phenylaniline in the form of hydrochloride.

4. A process according to claim 3 wherein the recovery procedure comprises adding sulfuric acid to said extract and recovering the 2-nitro-4-amino-N-phenylaniline in the form of a mixture of hydrochloride and sulfate.

5. A process according to claim 4 wherein the reaction is carried out at a temperature in the range of about 140° and 150°c and the molar ratio of aniline to 4-fluoro-3-nitroaniline is in the range of about 5:1 to 6:1.

6. A process according to claim 4 wherein the recovery procedure comprises reacting said hydrochloride and sulfate obtained with a base and recovering the 2-nitro-4-amino-N-phenylaniline in the form of the free base.

7. A process according to claim 1 wherein the recovery procedure comprises removing unreacted aniline from the reaction mixture, extracting the reaction mixture with aqueous hydrochloric acid to dissolve and form an extract containing 2-nitro-4-amino-N-phenylaniline and recovering said 2-nitro-4-amino-N-phenylaniline from said extract in the form of hydrochloride.

8. A process according to claim 7 wherein the recovery procedure comprises adding sulfuric acid to said extract and recovering the 2-nitro-4-amino-N-phenylaniline in the form of a mixture of hydrochloride and sulfate.

9. A process according to claim 8 wherein the reaction is carried out at a temperature in the range of about 140° to 150°C and the molar ratio of aniline to 4-fluoro-3-nitroaniline is in the range of about 5:1 to 6:1.

10. A process according to claim 8 wherein the recovery procedure comprises reacting said hydrochloride and sulfate obtained with a base and recovering the 2-nitro-4-amino-N-phenylaniline in the form of the free base.

* * * * *